(12) United States Patent
Karunaratne et al.

(10) Patent No.: US 8,158,956 B2
(45) Date of Patent: Apr. 17, 2012

(54) PHOTOACTIVATABLE PAINT CURING DEVICE AND METHOD

(75) Inventors: Nirupama Karunaratne, Alliston (CA); Darin John Long, Orangeville (CA); Robert Ricci, Woodbridge (CA); William Lacey, Shelburne (CA); Michel Van Muyen, Coldwater (CA)

(73) Assignee: Honda Motor Co., Ltd., Tokyo (JP)

( * ) Notice: Subject to any disclaimer, the term of this patent is extended or adjusted under 35 U.S.C. 154(b) by 633 days.

(21) Appl. No.: 12/324,662

(22) Filed: Nov. 26, 2008

(65) Prior Publication Data
US 2010/0130636 A1    May 27, 2010

(30) Foreign Application Priority Data

Nov. 21, 2008    (CA) ..................................... 2644766

(51) Int. Cl.
*G21K 5/10*    (2006.01)
(52) U.S. Cl. ......... 250/454.11; 250/455.11; 250/453.11; 250/492.1; 250/493.1; 250/504 R
(58) Field of Classification Search ............. 250/455.11, 250/454.11, 453.11, 492.1, 493.1, 504 R; 118/620, 641, 642
See application file for complete search history.

(56) References Cited

U.S. PATENT DOCUMENTS

| | | | |
|---|---|---|---|
| 4,844,947 A * | 7/1989 | Kasner et al. | .................. 427/510 |
| 5,997,941 A | 12/1999 | Dannenhauer et al. | |
| 6,248,804 B1 | 6/2001 | Lutz | |
| 6,257,297 B1 | 7/2001 | Chenetski | |
| 6,579,913 B2 | 6/2003 | Klinkenberg et al. | |
| 6,617,589 B2 * | 9/2003 | Ueno | ........................ 250/455.11 |
| 6,696,802 B1 | 2/2004 | Lezcano et al. | |
| 6,867,244 B2 | 3/2005 | Klinkenberg et al. | |
| 6,987,135 B2 | 1/2006 | Van Den Berg et al. | |
| 6,997,980 B2 | 2/2006 | Wegner et al. | |
| 7,175,712 B2 * | 2/2007 | Siegel | ........................... 118/620 |
| 7,372,530 B2 | 5/2008 | Stephenson et al. | |
| 7,425,586 B2 | 9/2008 | Weine Ramsey | |

(Continued)

FOREIGN PATENT DOCUMENTS

CA    2440640 A1    1/2003
(Continued)

OTHER PUBLICATIONS

Lu, H. et al., Impact of Curing Protocol on Conversion and Shrinkage Stress, Journal of Dental Research, 2005, pp. 822-826, 84(9).

(Continued)

*Primary Examiner* — Michael Maskell
(74) *Attorney, Agent, or Firm* — Standley Law Group LLP

(57) ABSTRACT

A device and method for curing photoactivatable paint coatings. An exemplary device may include a light chamber housing supported by a frame and undercarriage, the wall portions of the light chamber having a peripheral region terminating at a light emission region. A UV light source may be located within the light chamber. A motorized carrier may be provided and configured to controllably index and/or oscillate the UV light source along a travel path within the housing. The light chamber may be located adjacent a target paint cure location on a work piece, with the UV light emission region facing the paint cure location. Once properly located, the UV light source may be indexed and/or oscillated along the travel path to deliver UV light to the target paint cure location so as to cure UV curable paint thereon.

26 Claims, 13 Drawing Sheets

U.S. PATENT DOCUMENTS

| | | | |
|---|---|---|---|
| 7,488,518 | B2 | 2/2009 | Ortlieb et al. |
| 7,498,362 | B2 | 3/2009 | Ramsey |
| 2002/0158209 | A1* | 10/2002 | Ueno ................... 250/455.11 |
| 2003/0036604 | A1 | 2/2003 | Meisenburg et al. |
| 2004/0116554 | A1 | 6/2004 | Karunaratne et al. |
| 2004/0135159 | A1* | 7/2004 | Siegel ............................ 257/88 |
| 2004/0232358 | A1* | 11/2004 | Moruzzi .................. 250/504 R |
| 2005/0133732 | A1* | 6/2005 | Ohtomo et al. ............ 250/492.1 |
| 2005/0266235 | A1 | 12/2005 | Nakajima et al. |
| 2006/0021537 | A1* | 2/2006 | Ohtsu et al. ................... 101/487 |
| 2006/0100302 | A1 | 5/2006 | Krohn |
| 2006/0165882 | A1 | 7/2006 | Stropp et al. |
| 2006/0205843 | A1 | 9/2006 | Karunaratne et al. |
| 2006/0274421 | A1 | 12/2006 | Okamitsu et al. |
| 2006/0292311 | A1 | 12/2006 | Kilburn et al. |
| 2007/0191509 | A1 | 8/2007 | Kobayashi |
| 2008/0032037 | A1 | 2/2008 | Frey et al. |
| 2009/0045356 | A1* | 2/2009 | Briggs et al. ............. 250/504 R |
| 2010/0076109 | A1 | 3/2010 | Kang et al. |

FOREIGN PATENT DOCUMENTS

| | | |
|---|---|---|
| CA | 2595736 A1 | 9/2006 |
| EP | 1274516 B1 | 11/2005 |
| JP | 5-305259 A | 11/1993 |
| WO | 02/074452 A2 | 9/2002 |
| WO | 2007/062312 A1 | 5/2007 |

OTHER PUBLICATIONS

Meyer, G.R. et al., Decrease in Power Output of New Light-emitting Diode (LED) Curing Devices with Increasing Distance to Filling Surface, The Journal of Adhesive Dentistry, 2002, pp. 197-204, 4(3).

Miyazaki, M. et al., Effect of light exposure on fracture toughness and flexural strength of light-cured composites, Dental Materials, Nov. 1996, pp. 328-332, 12.

Scott, B.A. et al., Effect of Disposable Infection Control Barriers on Light Output from Dental Curing Lights, Journal of the Canadian Dental Association, Feb. 2004, pp. 105-110, 70(2).

Suh, B.J. et al., Shrinkage Stress Relaxation using Pulsed Curing, Dental Materials, 1998, pp. 280, 77 (AADR Abstracts).

Usumez, S. et al., Degree of conversion of two lingual retainer adhesives cured with different light sources, European Journal of Orthodontics, 2005, pp. 173-179, 27.

Dugan, W.T. et al., Influence of a glutaraldehyde disinfecting solution on curing light effectiveness, General Dentistry, Jan.-Feb. 1989, pp. 40-43.

Fan, P.L. et al., Irradiance of visible light-curing units and voltage variation effects, JADA, Sep. 1987, pp. 442-445, 115.

Felix, C.A. et al., The Effect of Distance from Light Source on Light Intensity from Curing Lights, The Journal of Adhesive Dentistry, 2003, pp. 283-291, 5(3).

Friedman, J., Variability of Lamp Characteristics in Dental Curing Lights, Journal of Esthetic Dentistry, Nov./Dec. 1989, pp. 189-190, 1(6).

El-Mowafy, O. et al., Intensity of quartz-tungsten-halogen light-curing units used in private practice in Toronto, JADA, 2005, pp. 766-773, 136(6).

Moseley, H. et al., An assessment of visible-light polymerizing sources, Journal of Oral Rehabilitation, 1986, pp. 215-224, 13.

Prati, C. et al., Effect of air, dentin and resin-based composite thickness on light intensity reduction, American Journal of Dentistry, Oct. 1999, pp. 231-234, 12(5).

Price, R.B. et al., Effect of Distance on the Power of Density from Two Light Guides, Journal of Esthetic Dentistry, 2000, pp. 320-327, 12(6).

Sakaguchi R.L. et al., Curing light performance and polymerization of composite restorative materials, J. Dent., 1992, pp. 183-188, 20(3).

Canadian Intellectual Property Office, International Search Report and Written Opinion for PCT/CA2010/001035, Oct. 4, 2010, 9 pages.

* cited by examiner

PHOTOACTIVATABLE PAINT CURING DEVICE AND METHOD

CROSS-REFERENCE TO RELATED APPLICATIONS

As authorized by 35 U.S.C. §119, this application claims priority to and hereby incorporates by reference Canadian Application Serial No. 2644766, titled PHOTOACTIVATABLE PAINT CURING DEVICE AND METHOD, filed on Nov. 21, 2008.

BACKGROUND OF THE INVENTIVE FIELD

Conventional manufacturing techniques have seen many improvements in recent years and painting techniques are no exception. A wide range of paint systems are now available, including those formulated with a solvent or water base and electrostatic powder coatings. Solvent or water based coatings require a curing period following application of a paint layer. Of course, the longer the curing time needed, the greater the cost associated with the resulting painting step. Painting steps are usually upstream of several assembly steps. It is all too common in some cases to detect, downstream of the painting step, imperfections in, or damage to, the painted surface, requiring special remediation steps to correct the problem. However, it can be difficult to repair the paint finish without excessive time spent or collateral damage to neighboring components.

Photoactivatable paints offer significant promise and are typically cured by UV radiation (otherwise known as UV light). For example, there is known a dual cure UV system, which utilizes heat and UV radiation and is able to adequately cure any area of a 3D configuration. However, there are numerous limitations to current photoactivatable paint systems. It is often required to access shadow areas of a 3-D configuration with relatively narrow access points. This is not a problem for heat curing or likewise dual curing (UV+Heat) since in both cases air is heated to the required curing temperature and its ability for access and thereby heating the paint is utilized to cure paint in both cases. However, there are two main drawbacks to this methodology. First, dual curing techniques may not be used on assemblies with neighboring heat-sensitive parts. Secondly, the dual curing techniques tend to require longer curing periods and are known to be energy inefficient.

It would be desirable to provide a novel approach to this task.

SUMMARY OF THE GENERAL INVENTIVE CONCEPT

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical, electrical or other configurations illustrated in the drawings are intended to exemplify embodiments of the invention. However, other alternative mechanical, electrical or other configurations are possible which are considered to be within the teachings of the instant disclosure. Furthermore, unless otherwise indicated, the term "or" is to be considered inclusive.

In one exemplary embodiment, there is provided a device for curing photoactivatable paint coatings. The device has an undercarriage, a frame positioned on the undercarriage, a housing supported on the frame, the housing having a back wall and a plurality of side wall portions extending therefrom to form a light chamber, each side wall portion having a peripheral region terminating at a UV light emission region, a UV light source contained within the light chamber, a motorized carrier to support the UV light source in the light chamber, the motorized carrier configured to index and/or oscillate the UV light source along a travel path within the housing, and a controller for controlling the motorized carrier, the frame and undercarriage being further arranged to locate the light chamber adjacent a target paint cure location on a work piece with the UV light emission region facing the paint cure location, the controller being operable to activate the UV light source and to initiate the motorized carrier to index and/or oscillate the UV light source along the travel path to deliver UV light to the target paint cure location for curing UV curable paint thereon.

In another exemplary embodiment, the motorized carrier includes a first linear actuator operating along a first axis and a second actuator operating along a second axis, and in one example the first and second axes are perpendicular, though they may be non-perpendicular if desired.

In another exemplary embodiment, the UV light source includes at least one bulb having a diameter of about 20 mm to about 40 mm, and in one example has a diameter of 25 mm.

In another exemplary embodiment, the light chamber has lateral dimensions of about 75 mm to about 100 mm and a depth of about 50 mm to about 100 mm. In one example, the light chamber has lateral dimensions of about 85 mm and about 60 mm respectively, and a depth of about 93 mm.

In another exemplary embodiment, the target paint cure location has lateral dimensions ranging from about 50 mm to about 300 mm, and from about 50 mm to about 300 mm respectively. In one example, the target paint cure location has dimensions of about 90 mm and about 60 mm respectively.

In another exemplary embodiment, the motorized carrier includes a first travel cylinder configured to displace the UV light source along the travel path between opposed ends of the light chamber, and a second indexing cylinder to cause a synchronized incremental shift of the path. The boundaries of the travel path may, in some cases, be identified by limit switch units, and a reversing unit may be employed for reversing the travel of the first travel cylinder following activation of a corresponding limit switch unit.

In another exemplary embodiment, the device employs a bulb in the form of a fluorescent UV lamp, emitting at a wavelength from about 200 to about 400 nanometers. More particularly, the fluorescent UV lamp may emit at a wavelength from about 320 nm to about 390 nm.

In alternative embodiments, the UV light source may include one or more LED, fluorescent and/or incandescent lamps.

In another exemplary embodiment, there is provided a device for curing photoactivatable paint coatings, comprising a housing, a radiation source located in the housing, the housing having opposed first boundaries to define a first pair of boundaries and a pair of second boundaries, the first and second boundaries defining a radiation passage, the radiation source configured to emit radiation through the radiation passage to cure a photoativatable paint coating at a target location located adjacent the radiation passage; a motorized support supporting the radiation source, the motorized support configured in a first phase to displace the radiation source along a first path between the first boundaries, the motorized support configured in a second phase to index the first path laterally along a second path between the second boundaries.

In another exemplary embodiment, the motorized support is configured to repeat the first and second phases. In one example, the motorized support is further configured to reverse the direction of the radiation source when it reaches a limit adjacent a corresponding first boundary. The motorized support may be further configured to oscillate the radiation source along the first path between the first boundaries and to index the first path between oscillations.

In another exemplary embodiment, there is provided a method for curing a photoactivatable paint coating on a work piece, comprising providing a radiation source within a housing, the housing having opposed wall portions to define a first pair of boundaries and a pair of second boundaries, the first and second boundaries defining a radiation passage therebetween, configuring the radiation source to emit radiation through the radiation passage, positioning the housing a sufficient distance to a photoativatable paint coating at a target location for the radiation source to activate the paint coating, displacing the radiation source in a first phase along a first path between the first boundaries and, in a second phase, indexing the first path laterally along a second path between the second boundaries.

Another exemplary embodiment provides a work piece comprising a cured coating according to the above method.

In still another exemplary embodiment, there is provided a device for curing photoactivatable paint coatings, comprising a curing radiation source configured to emit radiation sufficient to cure a photoactivatable paint coating at a target location when the radiation source is located at a source location operably spaced from the target location for curing the photoactivatable paint coating thereon, a motorized support for supporting the curing radiation source at the source location, the motorized support configured to advance the curing radiation source along a travel path, the motorized support further configured to cycle the curing radiation source along the travel path between a first position and a second position in order to vary over time the angle of attack of the radiation emitted from the curing radiation source on the photoactivatable paint coating at the target location.

A further embodiment comprises a housing to provide an operating region, a support for the housing, the support configured to maintain the housing stationary during cycling of the light source along the travel path. First and second actuators may be provided for moving the radiation source along the travel path relative to two corresponding axes.

An embodiment further comprises a support structure for supporting the first and second actuators, the travel path tracing a theoretical surface relative to the target surface, the support structure providing lateral and/or vertical adjustment of the theoretical surface relative to the target location. The theoretical surface may be planar or non planar.

An embodiment provides the motorized support further as a robot arm with the radiation support mounted on a remote end thereof. In this case, the remote end may additionally support a pair of linear actuators, the linear actuators supporting the radiation source.

In still another embodiment, there is provided a method for curing photoactivatable paint coatings, comprising providing a curing radiation source, orienting the curing radiation source at a source location relative to a target surface, spacing the source location from the target location, in order for the curing radiation source to emit radiation sufficient to cure a photoactivatable paint coating at the target location, establishing an operating region surrounding the target location, the curing radiation source having an angle of attack relative to the target location, cycling the curing radiation source along a travel path which is confined within an operating region between a first position and a second position in order to cycle changes in the angle of attack.

Another exemplary embodiment further comprises providing the curing radiation source within a housing with an inner region corresponding to the operating region with an opening, orienting the housing so that the opening is adjacent the target surface, and maintaining the housing substantially stationary relative to the target location while cycling curing radiation source along the travel path within the housing. A housing may also be provided to confine the operating region, a support for the housing, the support configured to maintain the housing stationary during cycling of the light source along the travel path.

In yet another exemplary embodiment, there is provided a method for curing photoactivatable paint coatings in confined regions of a vehicle body, comprising providing a curing radiation source, orienting the curing radiation source at a source location in a confined region in a vehicle body relative to a target surface in the confined region, spacing the source location from the target location, in order for the curing radiation source to emit radiation sufficient to cure a photoactivatable paint coating at the target location, establishing an operating region surrounding the target location, the curing radiation source having an angle of attack relative to the target location, cycling the curing radiation source along a travel path within an operating region between a first position and a second position in order to cycle changes in the angle of attack.

A further exemplary embodiment includes locating the curing radiation source within a housing with an inner region corresponding to the operating region, the housing having an opening and being of sufficiently compact configuration to be located within the confined region, the housing further including an opening, orienting the housing so that the opening is adjacent the target surface, and maintaining the housing substantially stationary relative to the target location while cycling the curing radiation source along the travel path within the housing. In one example, the support is configured to maintain the housing stationary during cycling of the light source along the travel path.

Another exemplary embodiment provides a vehicle comprising a cured paint coating according to the above method.

BRIEF DESCRIPTION OF THE DRAWINGS

Several exemplary embodiments of the present invention will be provided, by way of examples only, with reference to the appended drawings, wherein.

DETAILED DESCRIPTION OF EXEMPLARY EMBODIMENTS

Figure 2:
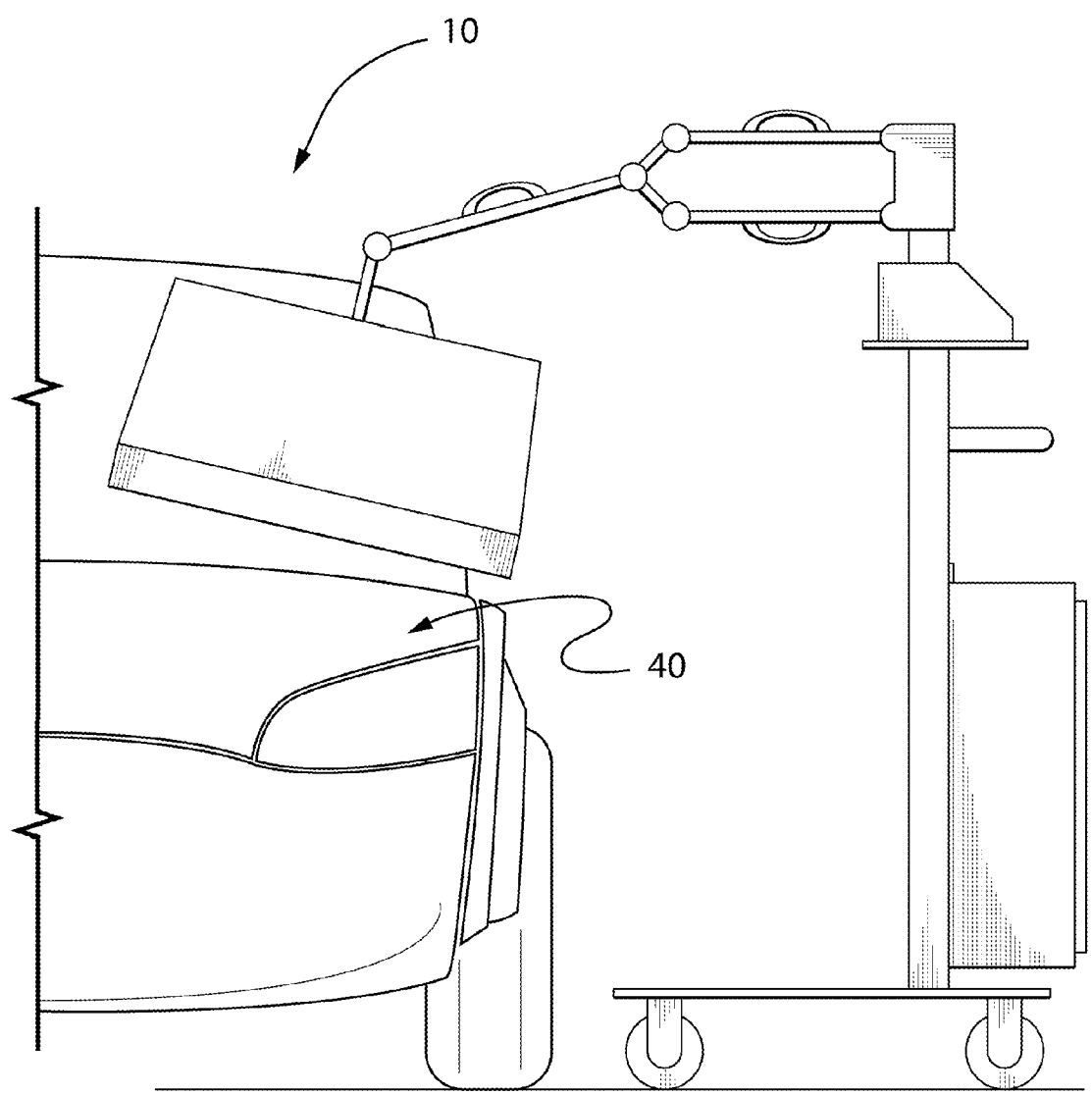
FIG. 2 is another side view of the device of FIG. 1 in an operative configuration.
Figure 2A:
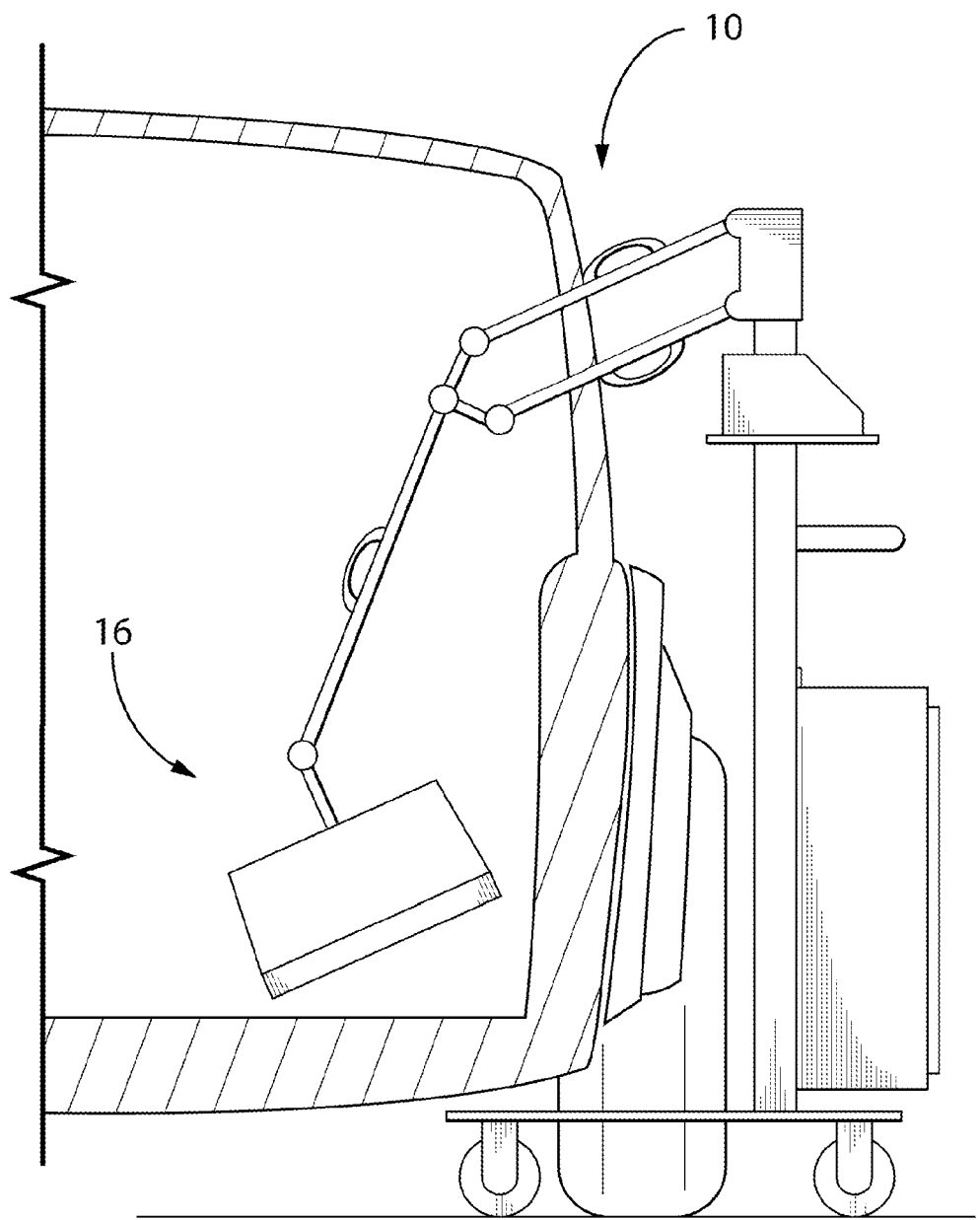
FIG. 2*a* is another side view of the device in another operative configuration.

Referring to the figures, there is provided a UV curing device 10 having an undercarriage 12 with a frame 14 positioned on the undercarriage 12. A housing 16 is supported on the frame 14 and has a back wall portion 18 and a plurality of side wall portions 20 extending therefrom to form a light chamber 22. The side wall portions 20 provide a peripheral region terminating at a UV light emission region 24. A UV light source 30 is contained within the light chamber 22. The frame has an arm 26 made up of a number of articulated arm portions 26a, joined at respective joints shown at 26b, allowing the arm to be adjusted to bring the housing 16 into position relative to a target paint cure location 40 as can be seen in FIGS. 2 and 2a. The arm 26 extends outwardly from a post 28.

Figure 1:
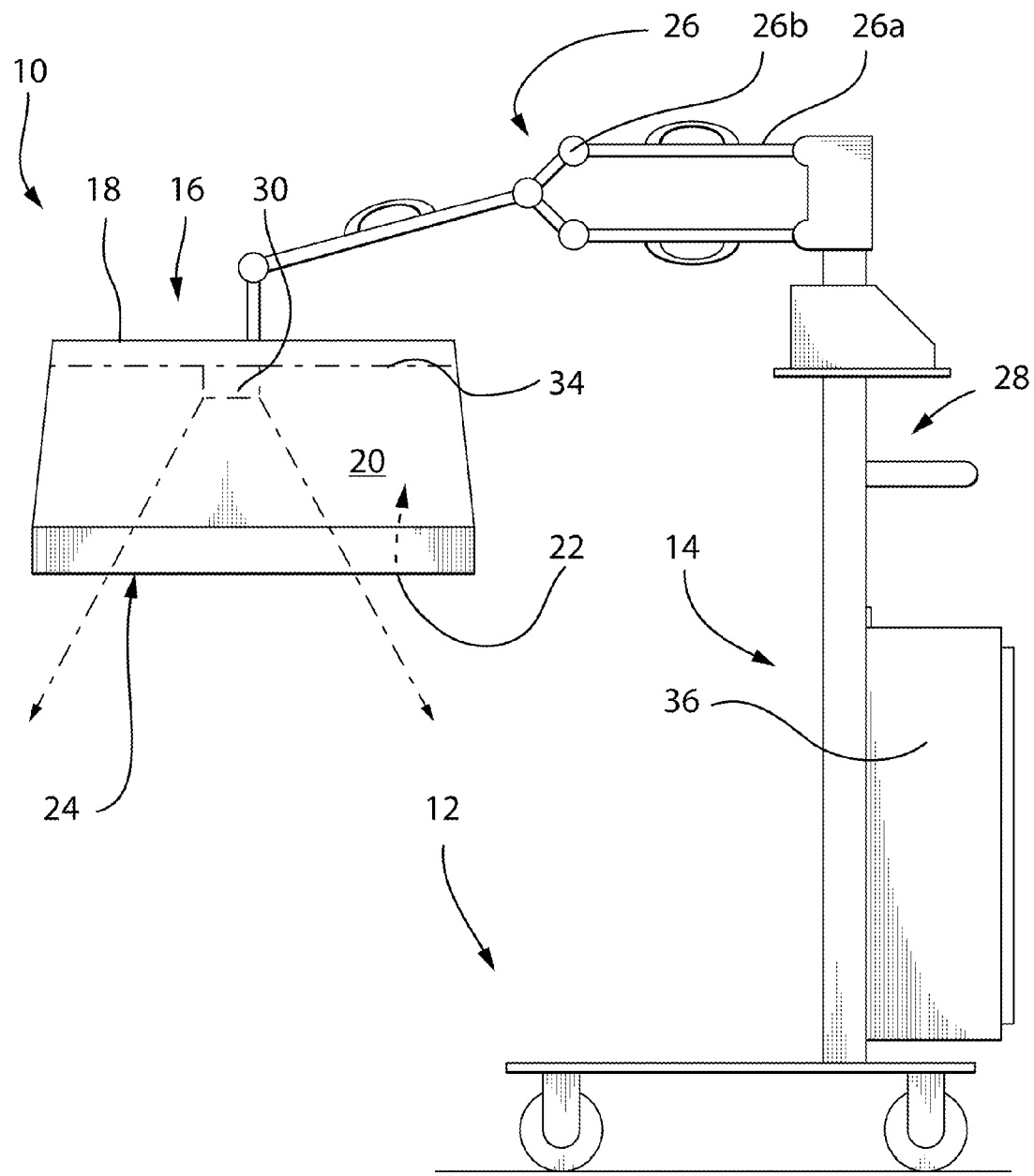
FIG. 1 is a side view of a device for curing photoactivatable paint coatings.
Figure 3:
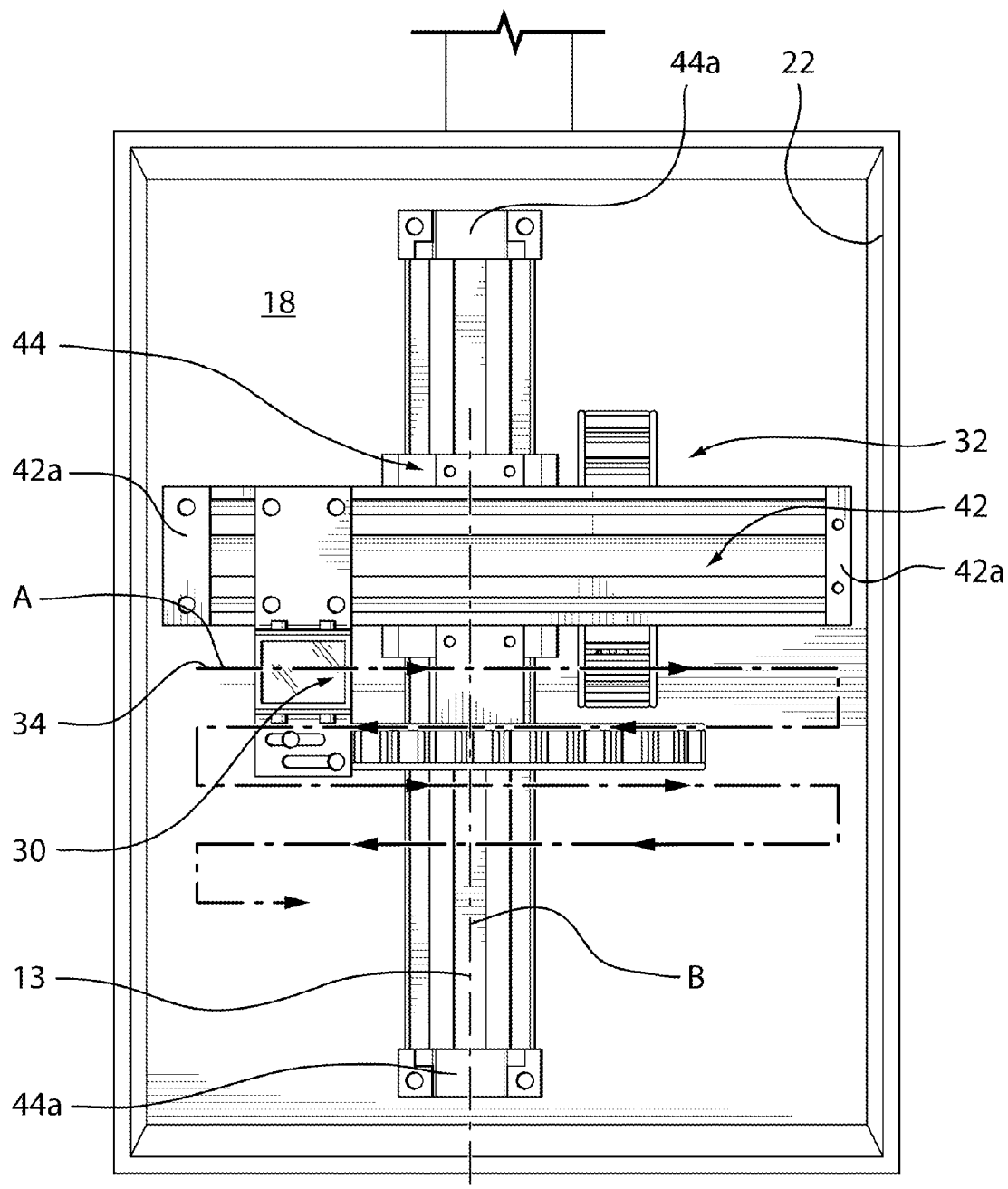
FIGS. 3 and 4 are plan views of a housing portion of the device of FIG. 1 in alternative operational configurations.
Figure 4:
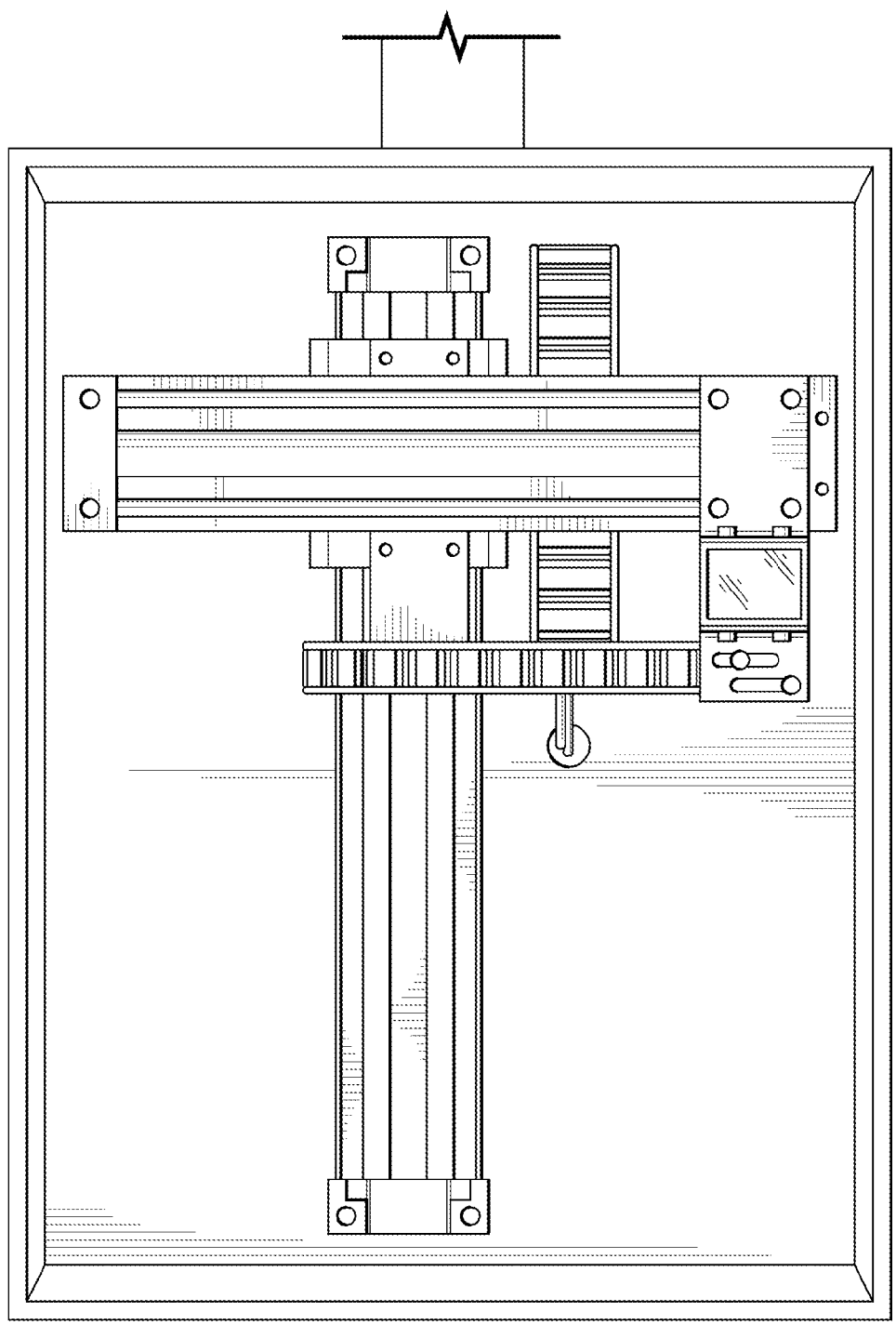

As shown in FIG. 3, a motorized carrier 32 supports the UV light source 30 in the light chamber 22 and is configured to index and/or oscillate the UV light source along a light path 34. Referring to FIG. 1, a controller 36 is also provided for controlling the motorized carrier 32. The frame 14 and undercarriage 12 are further arranged to locate the light chamber 22 adjacent the target paint cure location 40 (FIG. 2) on a work piece with the UV light emission region 24 facing the target paint cure location 40. As shown in FIG. 2, the target paint cure location is illustrated to be on an exterior surface of a vehicle body. However, the device 10 may be particularly useful, as shown in FIG. 2a, to be deployed in confined spaces within, or near, a work space, such as within an inner region of a vehicle body, for target paint cure locations which are otherwise difficult to reach in order to provide sufficient direct UV radiation for effective curing. In this latter case, the housing 16 shown in FIG. 2a is proportionally smaller than the housing 16 of FIG. 2, when compared with the overall size of the vehicle body. Thus, in the example of FIG. 2a, the device 10 is particularly useful for repairing damaged paint coatings, especially at locations which are difficult to reach using traditional UV radiation techniques, such as in fender wells, engine, passenger or trunk compartments, for instance, within the vehicle body.

The controller 36 is operable to activate the UV light source 30 and to initiate the motorized carrier 32 to index and/or oscillate the UV light source 30 along the light path 34 to deliver UV light to the target paint cure location 40 for curing UV curable paint thereon. The speed at which the motorized carrier 32 displaces the UV light source will depend on a number of factors, including the power of the UV light source, the proximity of the UV light source to the target location, the photoactivation rate of the paint and the like. That being said, in one example, the speed of travel of the UV light source along the light path 34 may, for instance, range from 5 cm per second to 50 cm per second, while the housing 16 remains stationary, though other speeds may also be applicable in some cases. In one example, the speed of travel is set at 10 cm per second and has been shown to yield favorable results.

Referring to FIG. 3, the motorized carrier includes a first linear actuator 42 operating along a first axis A which is parallel to the light path 34 and a second linear actuator 44 operating along a second axis B which is transverse to the first axis A. In this case, the first and second axes A and B are perpendicular, though other arrangements of one or more axes may be used as desired.

Figure 6A:
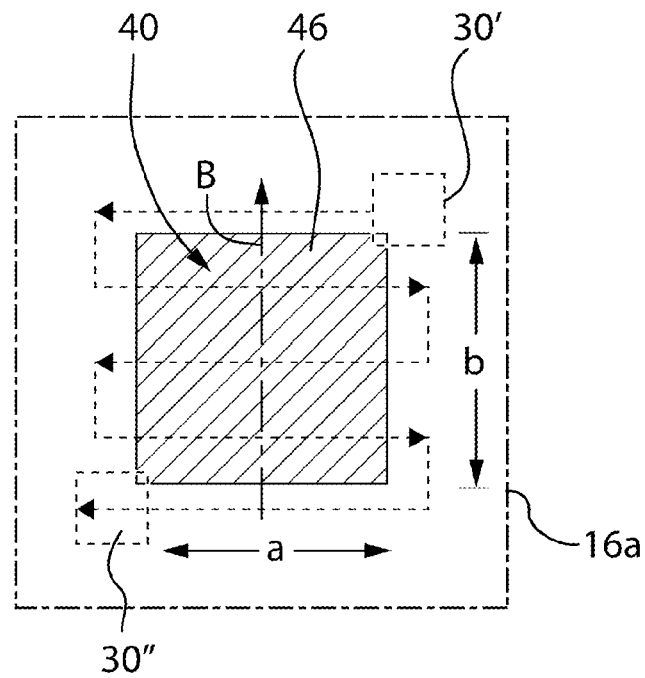
FIGS. 6a and 6b are schematic views showing a comparative paint curing method using the device of FIG. 1.

The UV light source 30, in this example, may be provided with at least one bulb having a diameter of 20 to 40 mm, and more particularly a diameter of about 25 mm. For a UV light source of this dimensional range, the light chamber 22 may be provided with lateral dimensions of 75 mm to 100 mm and a depth of 50 to 100 mm. More particularly, the light chamber 22 may be found to work in a vehicle assembly environment with lateral dimensions of between 85 mm and 60 mm respectively and a depth of 93 mm. With these dimensions, as seen in FIG. 6a, a target location 40 having lateral dimensions, such as dimension "a" ranging from 50 mm to 300 mm and dimension "b" ranging from 50 mm to 300 mm, may yield desirable results with sufficient curing. The target location 40 may, within this range, have dimensions of 90 mm and 60 mm respectively, making the device particularly useful for paint curing on target paint cure locations in confined locations within a work piece, for instance. That being said, other dimensions may also be found to yield useful results.

The light source 30 is provided by a bulb which, in one example, is a fluorescent lamp, emitting at a wavelength from 200 to 400 nanometers, more particularly from 320 to 390 nm. However, the light source may include one or more LED, fluorescent and/or incandescent lamps. In one example, the device utilizes a Medium to Low pressure microwave lamp, commercially available from FUSION under the model name PC-1 to generate a reasonably consistent UV radiation intensity output over time to achieve a reasonably consistent UV curing process. Testing has shown device 10 to be useful in curing thiol-based UV curable paints commercially available from AKZO NOBEL. The device 10, in most cases, may avoid the need to remove heat sensitive parts for high intensity UV curing of a UV coating to obtain useful properties and performance. The exemplary light source 30 has been demonstrated not to heat the target baking area above 35 degrees Celsius over the duration (zero to 10 minutes) of a paint cure operation (at a distance of 1 mm to 30 mm from the target paint cure location). This example may be useful to cure paint on substrates having relatively larger and/or contoured surfaces as well as to eliminate, in some cases, the need to remove heat sensitive parts when the curing device and process as described is applied to a region on an assembled vehicle, thus giving rise to a relatively rapid, energy efficient process.

The device 10, in some cases, is capable of emitting a wider spectral output without raising the substrate temperature above 35 degrees Celsius. The housing may be selected to be relatively compact, to allow ample access to relatively narrow spaces, as shown in FIG. 2a, which were previously unable to receive direct UV radiation, more particularly direct oscillating UV radiation. The device 10 thus provides a UV paint curing system when combined with a suitable UV activatable paint composition.

While the device 10, in this particular example, makes use of a single lamp, it will be understood that a device of the present invention may similarly be operated with more than one lamp as desired, such as with a bank of UV lamps, provided that the bank of UV lamps is moving, for example in an oscillating or repeating manner, along a light path relative to the vehicle and operatively positioned relative to the target surface. A device of the present invention may also similarly be operated with a lamp(s) of different size(s).

Thus, in one example configuration, the device enables a UV light source to be located inside a housing with the provision of an indexable track to allow for oscillating of the light relative to a repair site, while the housing remains stationary. The device may involve two air cylinders (such as an SMC programmable brake cylinder—index cylinder and a SMC pneumatic cylinder—travel cylinder) in a single configuration to effectively move the UV lamp to cure relatively larger areas (for example 300 mm×300 mm). The brake cylinder (index cylinder) may be utilized to enable incremental travel along the axis B (for example a travel of about 50 mm) with capabilities to be programmed to much smaller increments (for example a travel in the order of about 1 mm or more). The lamp may then be displaced to ensure uniform and adequate UV light exposure of the target location. This configuration thus enables pre programming of travel length in intervals, for example ranging from about 10 mm to about 50 mm. The SMC pneumatic cylinder (travel cylinder) enables motion along the axis B. The travel distance may be set by using position adjustable limit switches thus capable of traveling between a range of required lengths, for instance a range of 100 to 300 mm, though other lengths may also be appropriate depending on the dimensions of the target location and the operating parameters of the device. One cycle may thus include one increment along axis A (for example 50 mm) and one increment along axis B (for example 300 mm). The configuration completes a set or predetermined number of cycles (for example six cycles) to cure a target surface (for instance having a square area of 300 mm×300 mm.

Thus, in one example, the motorized carrier thus includes a first travel cylinder configured to displace the light source along a travel path between opposed ends of the light chamber, and a second indexing cylinder to cause a synchronized incremental shift of the path. The boundaries of the travel path are identified by limit switch units, which may be position-adjustable as desired. A reversing unit may also be provided for reversing the travel of the first travel cylinder following activation of a corresponding limit switch unit.

While the device 10 is described as a UV device, capable of emitting UV radiation for curing a UV curable paint coating, there may be other applications using other photoactivatable paint coatings in which the device may be employed with another radiation source other than a UV radiation source, provided that the emission wavelength from the radiation source is complementary for curing the coating in question.

Figure 7A:
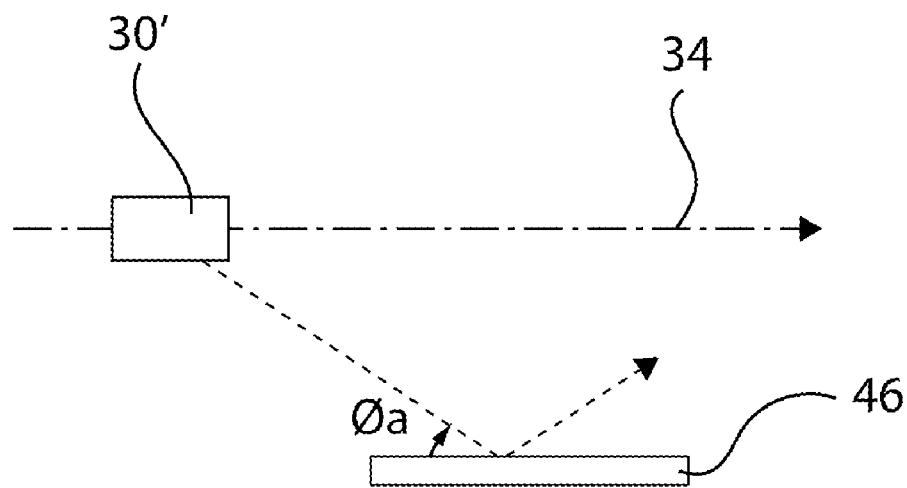
FIGS. 7a and 7b are schematic views showing successive operational positions in a method of one embodiment of the present invention.
Figure 7B:
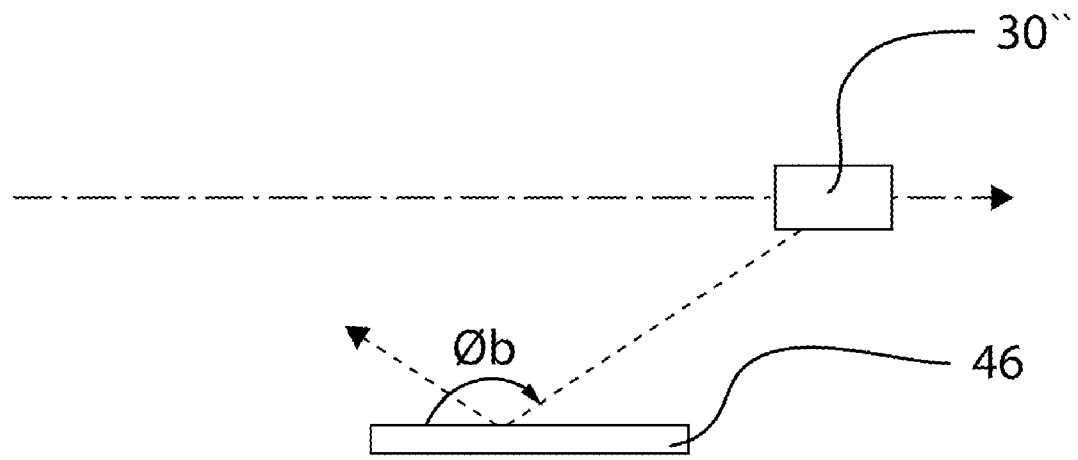

A particular feature of the device 10 is the motion imparted on the light source which enhances the paint curing function by progressively changing the physical location of the radiation source relative to the target location. In one example this progressive change in the physical location of the radiation source occurs at a substantially regular displacement rate or speed, but may also occur at a substantially irregular rate in other examples. While not intending to be bound by theory, it is believed that the changing or repositioning of the UV light source during curing achieves more thorough curing since the UV rays are able to reach different depths of the coating at different angles of attack depending on the distance between UV source and the target surface. This is seen in FIGS. 7*a* and 7*b*, where the radiation source 30' moves along path 34, above the target surface 46. It can be seen that the angle of attack changes from one location (θa) to another location (θb).

A further factor resides in the fact that the action of curing is light intensity dependent, while the intensity of light is a function of the distance between the UV source and the target surface, resulting in more complete and penetrating exposure of the molecular structure of the uncured coating on the target surface to the radiation causing curing to occur more effectively at deeper levels of the paint at the target surface. Both the UV light source and the resin composite cooperate to provide adequate polymerization (curing) of a UV curable coating. The coating composition, light intensity and wavelength are contributing factors. A curing light's intensity output depends on the type of light source, condition of the light source and optical filters and light guides, as well as voltage, and power; and the distance of the light from the coated surface. The "total energy" (that is, the product of light intensity and exposure time) may be seen to influence the mechanical properties of the cured coating surface. The distance of the curing light source from the coating surface may also be important. If the amount of light reaching the coating surface is reduced, the depth of cure may be decreased. The amount of light reaching the lower layers of the coating surface may be diminished as the distance is increased. Light intensity may also be reduced as distance increases for different types of lamps (tungsten, halogen, LED and UV curing lamps).

Thus, in some cases, the reciprocal, oscillating or regular motion of the lamp is believed to provide a more uniform intensity over the coating on a target surface, thus enabling a more uniform cure both on the surface of the coating and throughout the depth of the coating, so as to provide an effective and relatively consistent cure of the coating on the target surface while requiring relatively less energy to do so, in some cases.

While the device 10 utilizes a motorized carrier which displaces a UV radiation source along a linear path, it may also be configured to displace the UV radiation source along a non-linear path, such as for example a circular path, within the housing.

The housing is provided with inner surfaces which are able to reflect scattered UV radiation to the work piece and add to an improved radiation delivery. While the housing is useful in some configurations, the housing may not be required in all cases. Similar results may be achieved by mounting one or more UV lamps for similar oscillatory or repeating motion to pass the UV lamps and hence deliver direct UV radiation along a path established on the target surface so that such UV light is delivered directly to substantially the entire target surface at a speed selected according to one or more of the intensity of the UV light, the distance of the light to the target surface and the cure rate of the photoactivatable coating on or in the target surface.

Figure 8:
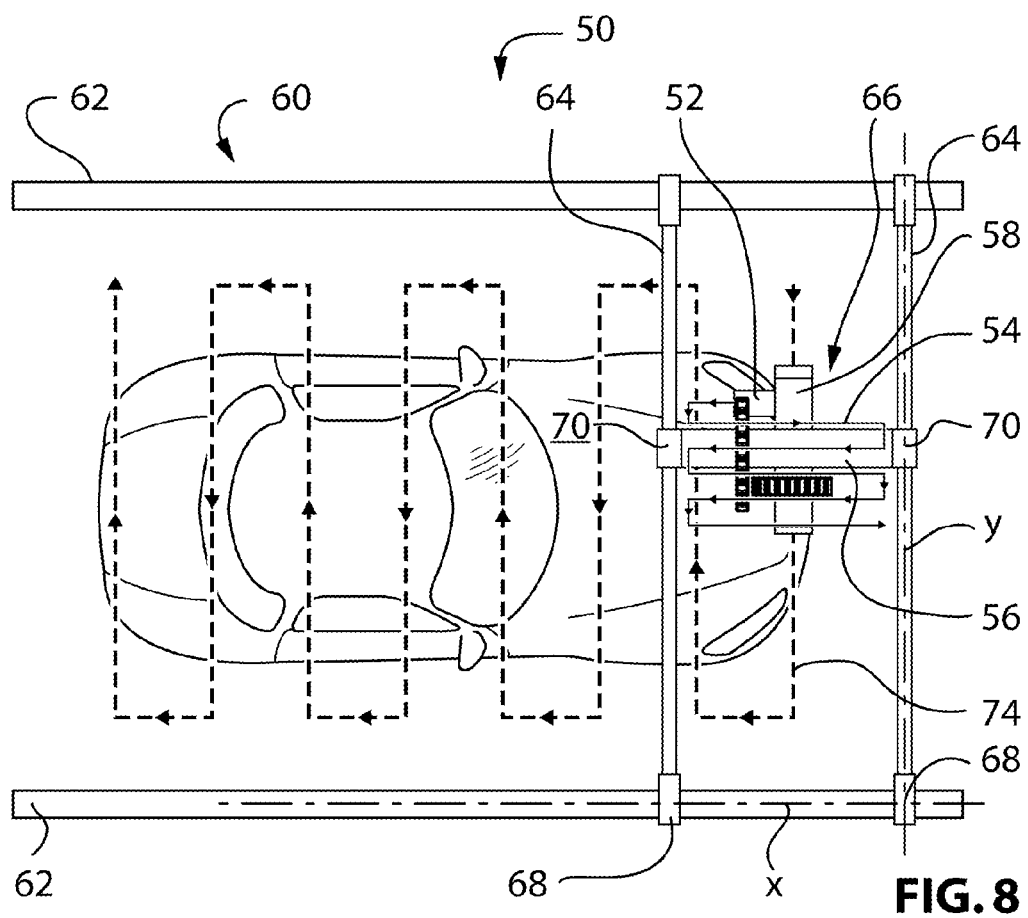
FIGS. 8 and 9 are schematic plan and side views, respectively of another curing device.

Referring to FIG. 8, another device is provided at 50 which has a motorized support which supports a micro curing radiation source at the source location 52 and which is configured to advance the curing radiation source along a micro travel path as shown at 54. A motorized support is configured to cycle the curing radiation source along the travel path shown at 54 between a first position shown at 30' and a second position 30" as shown in FIG. 6*a* in order to cycle changes in the angle of attack of the radiation emitted from the curing radiation source on an individual location on the photoactivatable paint coating at the target location. For example, as can be seen by FIGS. 7a and 7b, the angle changes from θa to θb as the radiation source moves along the path between two locations.

Figure 9:
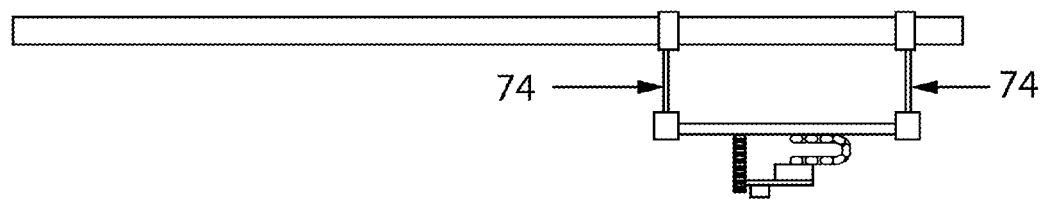
Figure 9:
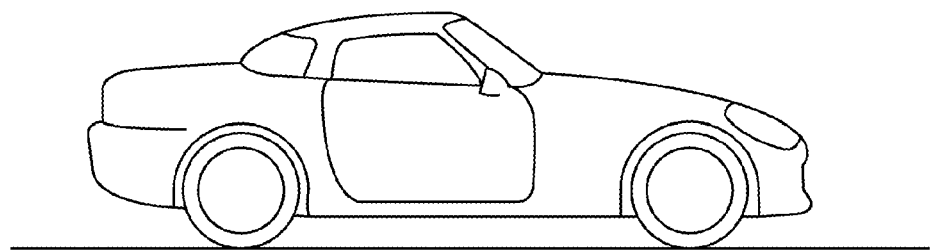

In this case, the radiation source is carried by first and second actuators shown at 56, 58 for moving the radiation source along the travel path relative to two corresponding axes x and y. The actuators are in turn supported by a support structure 60 including a pair of longitudinal track portions 62 and a pair of lateral track portions 64. An undercarriage structure 66 is movably supported by the track portions under the action of one or more drive units, for example as shown schematically at 68, 70. A pair of vertical drive units is also provided schematically at 74, allowing for vertical adjustments, as shown in FIG. 9.

Figure 10:
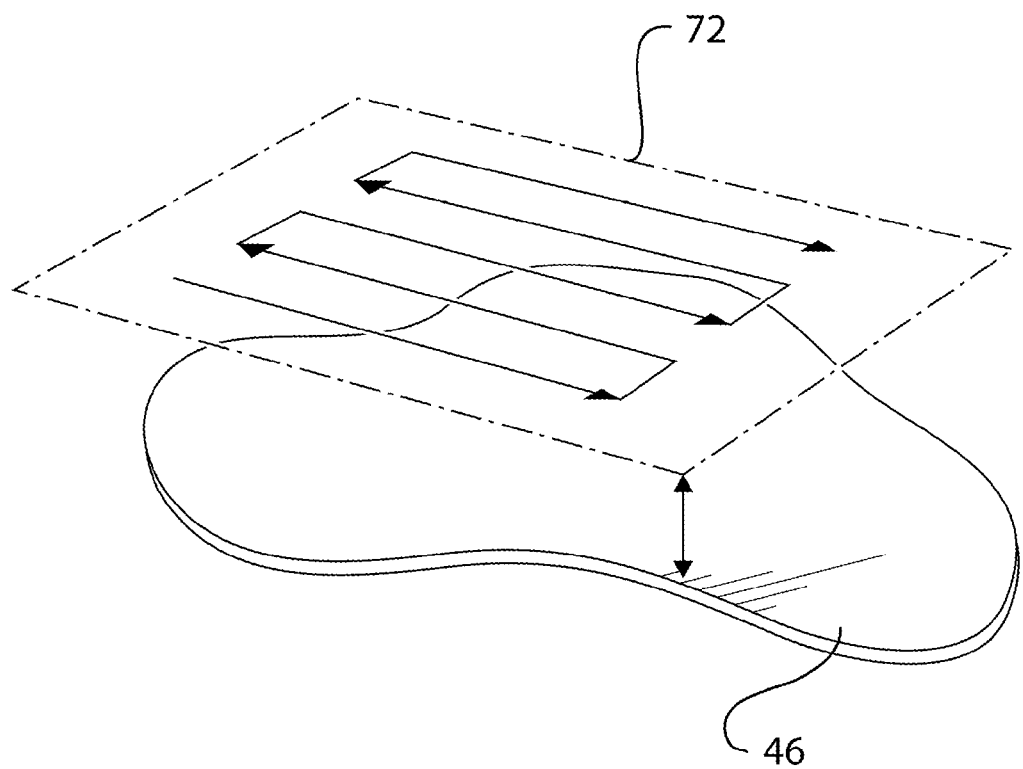
FIG. 10 is a perspective view of an operational aspect of a method according to one embodiment of the present invention.

In this case, the travel path may be considered to trace a theoretical surface 72 relative to the target surface as shown in FIG. 10. The support structure 60 thus provides lateral and/or vertical adjustment of the theoretical surface 70 relative to the target location 46. In one operating mode, the theoretical surface 70 is planar, by the fixed elevations of the linear actuators, but may be angled relative to the target surface by coordinated actuation of the actuators 56, 58 and drive units 68, 70 and 74. If desired, the drive units 68, 70 and 74 may be used with the actuators 56, 58 or in place of the actuators 56, 58 to provide a macro travel path shown in dashed lines at 74. In this case, the micro or macro travel paths may be employed singly or together.

Figure 11:
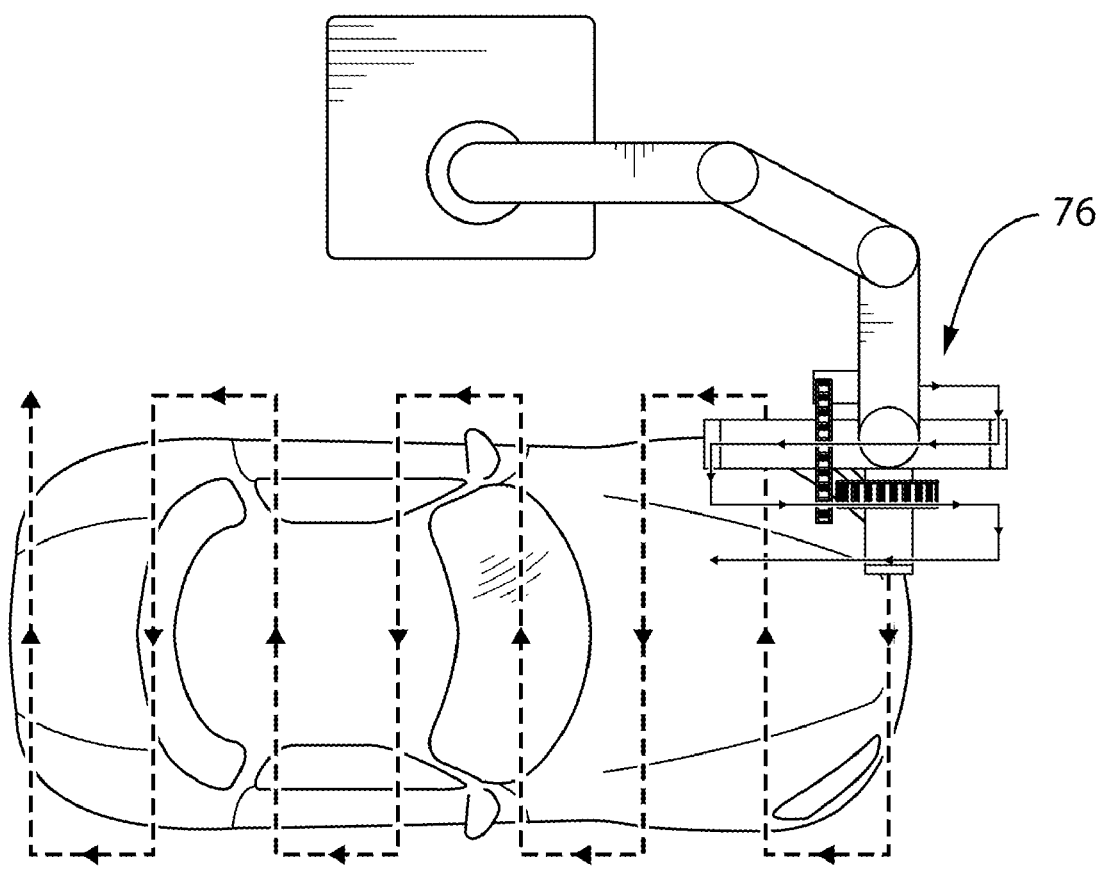
FIG. 11 is a schematic plan view of another curing device.

While the theoretical surface is planar in the above example, the theoretical surface may be non-horizontal and/or non-planar if desired, by implementing a combination of lateral and vertical drive units. In yet another example, the motorized support is provided by way of a robot arm 76 as shown in FIG. 11. In this case, the radiation support is mounted on a remote end thereof. It can be seen that the remote end supports a pair of linear actuators, which in turn support the radiation source. Alternatively, the radiation source may be held directly by the remote end without the actuators, so that the robot may be programmed to follow along the path.

EXAMPLE

Figure 5A:
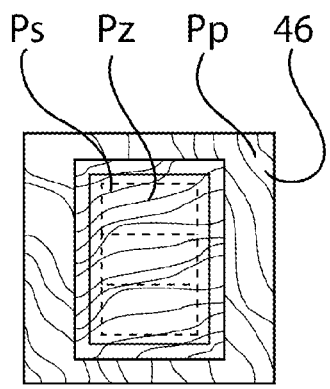
FIGS. 5a and 5b are schematic views showing a prior art paint curing method.
Figure 5B:
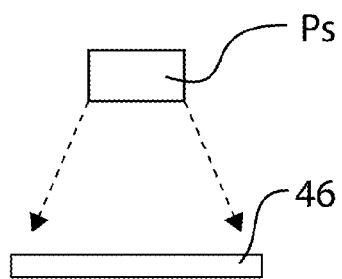

A trial was carried out in which test samples forming a target surface 46 in the form of a 5 cm×15 cm coated section (coated with BASF VP 126 UV Primer) was cured using a prior art configuration comprising an arrangement of multiple lamps (three lamps of models FUSION PC-1 in series and held stationary during curing). This configuration can be seen in figures 5a and 5b, where the UV source is shown in dashed lines at Ps and a central curing zone is shown at Pz.

A comparative test was also carried out using the configuration of FIG. 1 with a single FUSION PC-1 lamp model. As shown schematically at FIGS. 6a and 6b, the lamp of this configuration is located within a housing so as to result in an operating region 16a. For the trial using the configuration of FIG. 1, the UV source 30 was oscillated so that substantially the entire target surface 46 was exposed to direct UV radiation from the lamp. In other words, the UV source is oscillated, within the operating region to pass over the entire target surface 46 by adjusting the distances travelled along the A and B axes to exceed the surface area of the target surface. For the trial using the prior art configuration, the three UV sources (or lamps) Ps were centrally aligned with the target surface and held stationary. The distance of the UV sources to the target location and the time duration of UV radiation exposure was the same in both trial configurations. The UV sources were held 5 cm from the test panel for a duration of 120 seconds during both trials.

Figure 12:
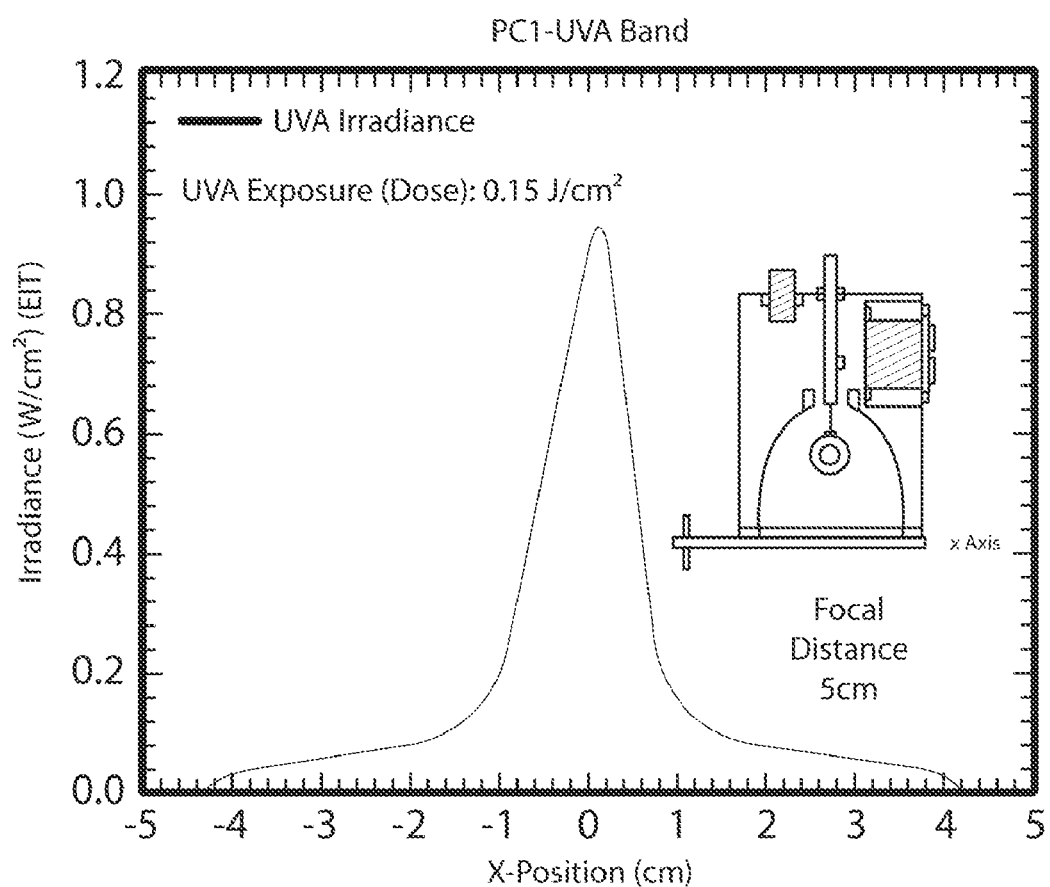
FIG. 12 is a plot of Irradiance for a curing method.

In the case of the prior art configuration, two regions of cure are found. The central region Pz of the target surface which is directly in front of the three stationary lamps showed effective UV curing. Surrounding the central region of the target surface was a peripheral region Pp which demonstrated less UV curing, the degree of curing generally reducing with a tail off (or reduction of UV light intensity) in the periphery or edges of the three stationary UV light sources. UV light intensity was measured with an EIT UV POWER PUCK II S/N 11104, a device commonly used for measuring UV output, to generate an EIT UV power map of each case in the form of a trace along an X axis relative to the focal point of the lamp. FIG. 12 illustrates an exemplified power map, showing the Irradiance at each location along the trace with the 0 position being that which is directly below. FIG. 12 also illustrates a cross sectional view of the exemplified UV lamp with a focal distance of 5 cm and identifying the x-axis running below the lamp opening.

Moreover, the central region Pz, demonstrated a cure level of as low as 50 to 60 percent depending on the distance from the focal point of the lamps. In this example, a Fourier Transform Infrared Spectroscopy (FTIR) method was employed to confirm cure of a UV curable coating. This was done by correlating acrylate conversion as a function of percentage of UV curing, corresponding to the loss of unsaturated acrylate groups, according to techniques established by Lazzara (1984) to determine the degree of polymerization. (Lazzara, M. G., "Techniques to Measure Melamine/Polyol reactions in a film," Journal of Coatings Technology, 56, No. 710, 19 (1984)).

In each case, after a subject panel was cured, six samples were taken from the center, and 1 cm, 2 cm and 2.5 cm from the center of the panel outwards in both directions. A small sample was removed from each area. The FTIR method was then carried out on each sample to determine the actual resin conversion to determine the cure. Each sample was deposited on quartz substrates for FTIR analysis.

The thickness of the coating layers was determined using a RUDOLPH AUTO EL II ELLIPSOMETER. The coating thickness was measured at 40 micrometers ±2 micrometers for all samples.

The chemical changes after UV curing of the coating samples were determined by FTIR spectra obtained for each sample, using a PERKIN ELMER FTIR spectrophotometer under the trade name "PARAGON 1000", according to and based on acrylate conversion. The consumption of alkene bonds (that is the (C=C) group in the coating) as a result of curing reaction was calculated in terms of the percentage reduction of C=C bond at 1665 $cm^{-1}$. As polymerization progresses, the amount of unsaturated alkene bonds (C=C) is reduced. (Ryczkowski, J., Rayss, J. Vibrational Spectroscopy, 22 (2000)).

Figure 13:
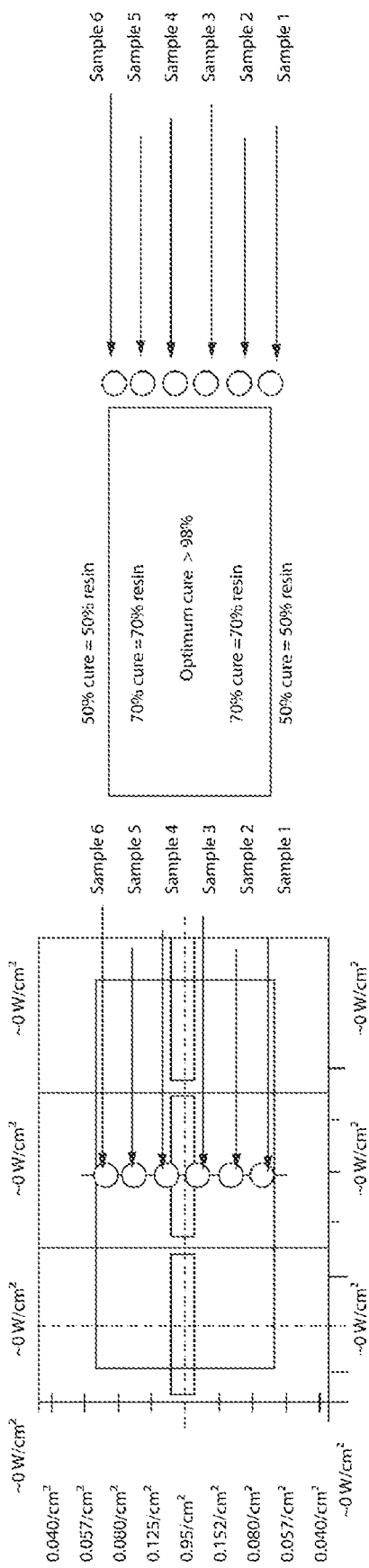
FIG. 13 is a schematic representations of a sample cure analysis of a prior art curing technique.
Figure 14:
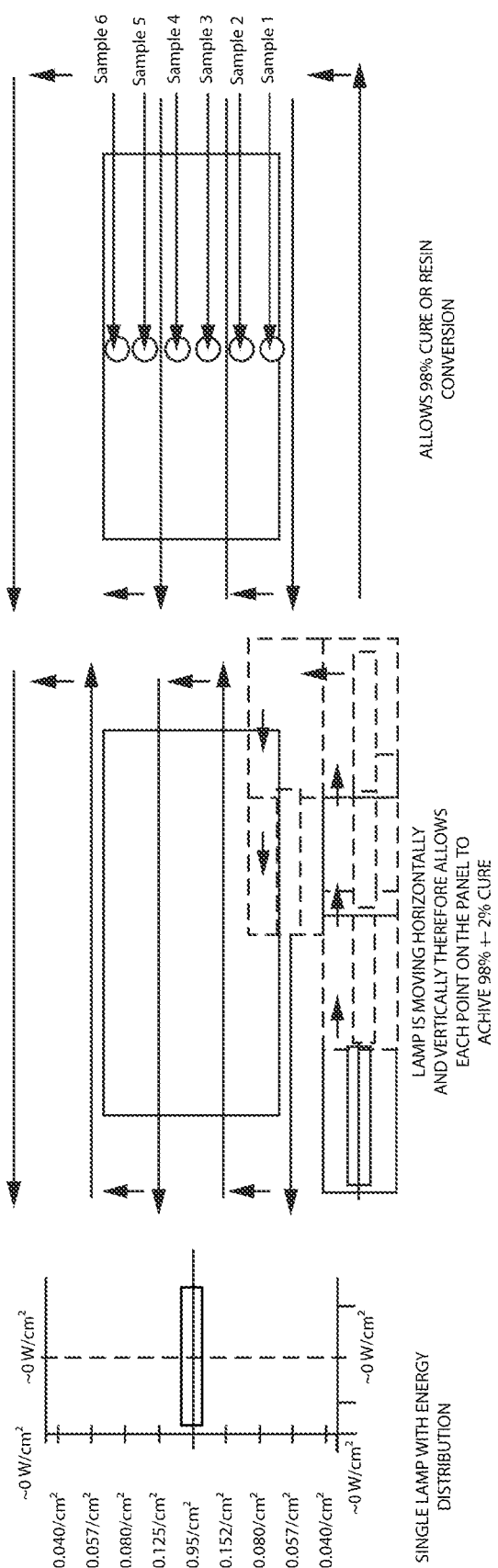
FIG. 14 is a schematic representation of a sample cure analysis of a curing technique according to one embodiment of the present invention.

Using the FTIR method, the prior art configuration trial was shown to achieve a 98% cure level for the central region Pz of the target surface that was directly aligned with or under the focal point of the lamp. As can be seen in FIG. 13 and in Table 1, below, samples 3 and 4, which represent the central location of the panel, showed 98% cure.

Figure 6B:
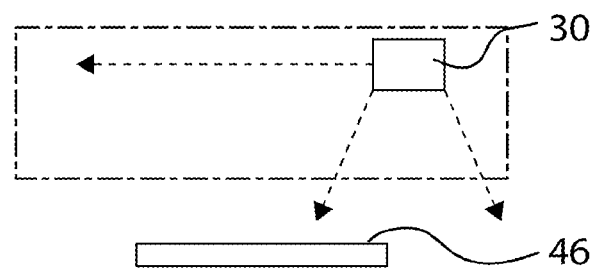

The configuration using the device of FIG. 1, as shown in FIGS. 6a and 6b, resulted in significantly improved through-cure when compared to the prior art configuration, with a 32 percent improvement in cure (that is, in resin conversion following UV irradiation) compared to the prior art procedure. The configuration using the device of FIG. 1 showed a significantly more uniform cure of 98%±2% over the entire target surface. The present method thus demonstrates a relatively more consistent cure over a relatively larger target surface, using a third less UV radiation, and thereby resulting in a potential savings in energy.

TABLE 1

| SAMPLE ID | LOCATION | CURE CONDITION OF THE COATING (Resin conversion) | | | |
|---|---|---|---|---|---|
| | | CONTROL | | TEST | |
| | | Surface cure | Through cure | Surface cure | Through cure |
| 1 | 2 cm from the center | 67% | 51% | 98% | 98% |
| 2 | 1 cm from the center | 77% | 68% | 98% | 98% |
| 3 | Center | 98% | 98% | 98% | 98% |
| 4 | Center | 98% | 98% | 98% | 98% |
| 5 | 1 cm from the center | 67% | 51% | 98% | 98% |
| 6 | 2 cm from the center | 77% | 68% | 98% | 98% |

The entire subject matter of each of the references described herein, including the following prior art references is incorporated herein by reference.

[1] Friedman J. Variability of lamp characteristics in dental curing lights. J Esthet Dent 1989; 1(6): 189-90.
[2] Dugan W. T., Hartleb J. H. Influence of a gluteraldehyde disinfecting solution on curing light effectiveness. Gen Dent 1989; 37(1): 40-3
[3] Fan P. L., Wozniak W. T., Reyes W. D., Stanford J. W. Iradiance of visible light curing units and voltage variation effects. J Am Dent Assoc 1987, 115: 442-5.
[4] Felix C. A., Price R. B. The effect of distance from light source on light intensity from curing lights. J Adhes Dent 2003; 5(4): 283-91.
[5] Miyazaki M, Ohida, Y, Moore B. K., Onose, H. Effect of light exposure on fracture toughness and flexural strength of light cured composites. Dent Mater 1996; 12(6): 328-32.
[6] Suh B. I., Cripe C. A., Cincionne F. Shrinkage stress relaxation using pulsed curing. J Dent Res 1998; 77:280 (Abstr No. 1394).
[7] Price R. B., Derand T., Sedaous M., Andreou P., Loney R. W. Effect of distance on the power density from two light guides. J Esthet Dent 2000; 12(6): 320-7
[8] Meyer G. R., Ernst C., Willershausen B. Decrease in power out put of new light-emitting diode (LED) curing devices with increasing distance to filling surface. J Adhes Dent 2002; 4(3): 197-204.
[9] Prati C., Chersoni S., Montebugnoli L., Montanari G. Effect of air, dentin and resin based composite thickness on light intensity reduction. Am J Dent 1999; 12(5): 231-4.
[10] Moseley H, Strang R., Stephen K. W. An assessment of visible light polymerizing sources. J Oral Rehabil 1986; 13: 215-24.
[11] Sakaguchi R. L., Douglas W. H., Peters M. C. Curing light performance and polymerization of composite restorative materials.

While the present invention has been described based on several exemplary embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A device for curing photoactivatable paint coatings, comprising:
   an undercarriage;
   a frame positioned on the undercarriage;
   a housing supported on the frame, the housing having a back wall and a plurality of side wall portions extending therefrom to form a light chamber, each side wall portion having a peripheral region terminating at a UV light emission region;
   a UV light source contained within the light chamber;
   a motorized carrier to support the UV light source in the light chamber, the motorized carrier including a first travel cylinder configured to displace the UV light source along a travel path between opposed ends of the light chamber so as to index and/or oscillate the UV light source along the travel path within the housing;
   a controller for controlling the motorized carrier within boundaries of the travel path, the boundaries being identified by limit switch units; and
   a reversing unit included with the motorized carrier for reversing the travel of the first travel cylinder following activation of a corresponding limit switch unit;
   wherein the frame and undercarriage are further arranged to locate the light chamber adjacent a target paint cure location on a work piece, with the UV light emission region facing the paint cure location; and
   wherein the controller is operable to activate the UV light source and to initiate the motorized carrier to index and/or oscillate the UV light source along the travel path to deliver UV light to the target paint cure location for curing UV curable paint thereon.

2. The device of claim 1, wherein the motorized carrier includes a first linear actuator operating along a first axis and a second actuator operating along a second axis.

3. The device of claim 2, wherein the first and second axes are perpendicular.

4. The device of claim 1, wherein the UV light source includes at least one bulb having a diameter of between about 20 to about 40 mm.

5. The device of claim 4, wherein the bulb has a diameter of about 25 mm.

6. The device of claim 5, wherein the light chamber has lateral dimensions of between about 75 mm to about 100 mm and a depth of between about 50 to about 100 mm.

7. The device of claim 6, wherein the light chamber has lateral dimensions of about 85 mm and about 60 mm, respectively, and a depth of about 93 mm.

8. The device of claim 7, wherein the target paint cure location has lateral dimensions ranging from about 50 mm to about 300 mm and from about 50 mm to about 300 mm respectively.

9. The device of claim 7, wherein the target paint cure location has dimensions of about 90 mm and about 60 mm, respectively.

10. The device of claim 1, wherein the motorized carrier includes a second indexing cylinder to cause a synchronized incremental shift of the path.

11. The device of claim 1, wherein the light source is a fluorescent UV lamp emitting at a wavelength between about 200 to about 400 nanometers.

12. The device of claim 1, wherein the fluorescent UV lamp emits at a wavelength between about 320 to about 390 nm.

13. The device of claim 1, wherein the UV light source includes one or more LED, fluorescent and/or incandescent lamps.

14. A device for curing photoactivatable paint coatings, comprising:
- a housing, the housing having opposed first boundaries to define a pair of first boundaries and a pair of second boundaries, the first and second boundaries being identified by limit switch units and defining a radiation passage;
- a radiation source located in the housing, the radiation source configured to emit radiation through the radiation passage to cure a photoativatable paint coating at a target location located adjacent the radiation passage; and
- a motorized support supporting the radiation source, the motorized support configured in a first phase to displace the radiation source along a first path between the first boundaries and in a second phase to index the first path laterally along a second path between the second boundaries, the motorized support including a reversing unit for reversing the displacement of the radiation source along the first path and/or the second path following activation of a corresponding limit switch unit.

15. The device of claim 14, wherein the motorized support is configured to repeat the first and second phases.

16. The device of claim 15, wherein the motorized support is configured to oscillate the radiation source along the first path between the first boundaries and to index the first path between oscillations.

17. A method for curing a photoactivatable paint coating on a work piece, comprising:
- providing a motorized support for supporting a radiation source within a housing, the housing having opposed wall portions that define a pair of first boundaries and a pair of second boundaries, the first and second boundaries being identified by limit switch units and defining a radiation passage therebetween;
- configuring the radiation source to emit radiation through the radiation passage;
- positioning the housing a sufficient distance from a photoactivatable paint coating at a target location for the radiation source to activate the paint coating;
- reversibly displacing the radiation source by way of the motorized support in a first phase along a first path between the first boundaries and, in a second phase, indexing the first path laterally along a second path between the second boundaries;
- wherein the motorized support includes a reversing unit for reversing the displacement of the radiation source along the first path and/or the second path following activation of a corresponding limit switch unit.

18. A method for curing photoactivatable paint coatings in confined regions of a vehicle body, comprising:
- providing a curing radiation source supported on a motorize carrier;
- orienting the curing radiation source at a source location in a confined region in a vehicle body relative to a target surface in the confined region;
- spacing the source location from the target location;
- in order for the curing radiation source to emit radiation sufficient to cure a photoactivatable paint coating at the target location, establishing an operating region surrounding the target location, the curing radiation source having an angle of attack relative to the target location; and
- cycling the curing radiation source, by way of the motorized carrier including a reversing unit, along a travel path within the operating region having boundaries defined by limit switch units between a first position and a second position in order to cycle changes in the angle of attack following activation of a corresponding limit switch unit.

19. The method of claim 18, further comprising locating the curing radiation source within a housing with an inner region corresponding to the operating region, the housing having an opening with a sufficiently compact configuration to be located within the confined region, orienting the housing so that the opening is adjacent the target surface, and maintaining the housing substantially stationary relative to the target location while cycling curing radiation source along the travel path within the housing.

20. The method of claim 18, wherein the support is configured to maintain the housing stationary during cycling of the light source along the travel path.

21. A work piece comprising a cured coating according to the method of claim 17.

22. A vehicle comprising a cured paint coating according to the method of claim 18.

23. A device for curing photoactivatable paint coatings, comprising:
- an undercarriage;
- a frame positioned on the undercarriage;
- a housing supported on the frame, the housing having a back wall and a plurality of side wall portions extending therefrom to form a light chamber, each side wall portion having a peripheral region terminating at a UV light emission region;
- a UV light source contained within the light chamber;
- a motorized carrier to support the UV light source in the light chamber, the motorized carrier including a first travel cylinder configured to displace the UV light source along a travel path between opposed ends of the light chamber, and a second indexing cylinder to cause a synchronized incremental shift of the path so as to index and/or oscillate the UV light source along the travel path within the housing, and;
- a controller for controlling the motorized carrier within boundaries;
- the boundaries of the travel path being identified by limit switch units including a reversing unit for reversing the travel of the first travel cylinder following activation of a corresponding limit switch unit;
- wherein the frame and undercarriage are further arranged to locate the light chamber adjacent a target paint cure location on a work piece, with the UV light emission region facing the paint cure location; and
- wherein the controller is operable to activate the UV light source and to initiate the motorized carrier to index and/or oscillate the UV light source along the travel path to deliver UV light to the target paint cure location for curing UV curable paint thereon.

24. The device of claim 23, wherein the light source is a fluorescent UV lamp emitting at a wavelength between about 200 to about 400 nanometers.

25. The device of claim 24, wherein the fluorescent UV lamp emits at a wavelength between about 320 to about 390 nm.

26. The device of claim 25, wherein the UV light source includes one or more LED, fluorescent and/or incandescent lamps.

* * * * *